United States Patent
Agudo Araque et al.

(10) Patent No.: US 12,047,027 B2
(45) Date of Patent: Jul. 23, 2024

(54) METHOD OF PROTECTING A CONVERTER OF A WIND TURBINE AND PROTECTION SYSTEM

(71) Applicant: Siemens Gamesa Renewable Energy Innovation & Technology S.L., Sarriguren (ES)

(72) Inventors: Andres Agudo Araque, Madrid (ES); Victor Bermejo Hernandez, Humanes de Madrid (ES); Fernando Vazquez-Prada Simon, Madrid (ES)

(73) Assignee: Siemens Gamesa Renewable Energy Innovation & Technology S.L., Sarriguren (ES)

(*) Notice: Subject to any disclaimer, the term of this patent is extended or adjusted under 35 U.S.C. 154(b) by 176 days.

(21) Appl. No.: 17/782,829

(22) PCT Filed: Dec. 3, 2020

(86) PCT No.: PCT/EP2020/084478
§ 371 (c)(1),
(2) Date: Jun. 6, 2022

(87) PCT Pub. No.: WO2021/122037
PCT Pub. Date: Jun. 24, 2021

(65) Prior Publication Data
US 2023/0006600 A1    Jan. 5, 2023

(30) Foreign Application Priority Data

Dec. 18, 2019 (EP) .................................. 19380036

(51) Int. Cl.
*H02P 29/68* (2016.01)
*H02J 3/36* (2006.01)
(Continued)

(52) U.S. Cl.
CPC ............... *H02P 29/68* (2016.02); *H02J 3/36* (2013.01); *H02J 3/381* (2013.01);
(Continued)

(58) Field of Classification Search
CPC .. H02P 29/68; H02P 2101/15; H02M 1/0009; H02M 1/32; H02M 7/537; H02J 3/36; H02J 3/381; H02J 2300/28
(Continued)

(56) References Cited

U.S. PATENT DOCUMENTS 9,705,487 B2 * 7/2017 Cade ..................... H03K 17/14
11,286,904 B2 * 3/2022 Andersen ................ H02J 3/48
(Continued)

FOREIGN PATENT DOCUMENTS

CN          105825019 B      10/2018
WO       WO 2019120404 A1     6/2019

OTHER PUBLICATIONS

Yan et al. (CN 109104113 A), Junction Temperature Compensating Grid Electrode Driver Date Published Dec. 28, 2018 (Year: 2018).*
(Continued)

*Primary Examiner* — Jorge L Carrasquillo
(74) *Attorney, Agent, or Firm* — Schmeiser, Olsen & Watts LLP

(57) ABSTRACT

A method of protecting a converter of a wind turbine and a respective protection system are provided. The converter is coupled to a generator of the wind turbine to perform conversion of electrical power produced by the generator, the converter including plural semiconductor components that are operational to provide the conversion of the electrical power. The method includes the performing of a step
(Continued)

of estimating a junction temperature of at least one of the semiconductor components by determining a current in the converter associated with power loss in one or more of the semiconductor components; estimating power loss associated with the one or more semiconductor components based on the determined current and on a state of the one or more semiconductor components; and using a thermal model to estimate the junction temperature of the semiconductor components based on the estimated power loss. The estimating step is repeatedly performed.

15 Claims, 5 Drawing Sheets

(51) Int. Cl.
    *H02J 3/38*     (2006.01)
    *H02M 1/00*     (2007.01)
    *H02M 1/32*     (2007.01)
    *H02M 7/537*    (2006.01)
    *H02P 101/15*   (2016.01)

(52) U.S. Cl.
    CPC .......... *H02M 1/0009* (2021.05); *H02M 1/32* (2013.01); *H02M 7/537* (2013.01); *H02J 2300/28* (2020.01); *H02P 2101/15* (2015.01)

(58) Field of Classification Search
    USPC ........................................ 318/471
    See application file for complete search history.

(56) References Cited

U.S. PATENT DOCUMENTS

2014/0239741 A1* 8/2014 Cade ............... H03K 17/14
                                                    307/117
2014/0346989 A1* 11/2014 James ............... H02M 7/48
                                                    318/400.26

OTHER PUBLICATIONS

Bohllaender (WO 2018029309 A1), Method for Operating a Current Converter and a Current Converter Operating According to Said Method Date Published Feb. 15, 2018 (Year: 2018).*
Senturk et al: Electro-thermal modeling for junction temperature cycling-based lifetime prediction of a press-pack IGBT JL-NPC-V5C applied to large wind turbines*, Energy Conversion Congress and Exposttion (ECCE}, SBLL TEEE, LEEE, 1? Sep. 2011 (2511-89-17). pp. 588-575, XPO22067214, DGL: 18. (Year: 2011).*
Gaoxian et al: Numerical IGST junction temperature calculation method for lifetime estimation of power semiconductors in the wind power converters®, 2614 Interratignal Power Electronics and Application Conference and Exposition, TEEE (Year: 2014).*
Zhou Dao et al.: "Dynamic thermal analysis of DFIG rotor-side converter during balanced grid fault"; 2014 IEEE Energy Conversion Congress and Exposition (ECCE); IEEE; Sep. 14, 2014 (Sep. 14, 2014); pp. 3097-3103; XP032680883; DOI:10.1109/ECCE.2014.6953821; [retrieved on Nov. 11, 2014].
Li Gaoxian et al.: "Numerical IGBT junction temperature calculation method for lifetime estimation of power semiconductors in the wind power converters"; 2014 International Power Electronics and Application Conference and Exposition; IEEE; Nov. 5, 2014 (Nov. 5, 2014); pp. 49-55; XP032734621; DOI: 10.1109/PEAC.2014.7037827; [retrieved on Feb. 9, 2015].
"Application Manual Power Semiconductors", second edition, available under https://www.semikron.com/dl/service-support/downloads/download/semikron-application-manual-power-semiconductors-english-en-2015.pdf.
Osman S Senturk et al.: "Electro-thermal modeling for junction temperature cycling-based lifetime prediction of a press-pack IGBT 3L-NPC-VSC applied to large wind turbines"; Energy Conversion Congress and Exposition (ECCE); 2011 IEEE; IEEE; Sep. 17, 2011 (Sep. 17, 2011); pp. 568-575; XP032067214; DOI: 10.1109/ECCE.2011.6063820; ISBN: 978-1-4577-0542-7.
European Search Report issued on May 19, 2020 for application No. 19380036.4.
International Search Report issued on Mar. 3, 2021 for application No. PCT/EP2020/084478.

* cited by examiner

METHOD OF PROTECTING A CONVERTER OF A WIND TURBINE AND PROTECTION SYSTEM

CROSS-REFERENCE TO RELATED APPLICATIONS

This application claims priority to PCT Application No. PCT/EP2020/084478, having a filing date of Dec. 3, 2020, which claims priority to EP Application No. 19380036.4, having a filing date of Dec. 18, 2019, the entire contents both of which are hereby incorporated by reference.

FIELD OF TECHNOLOGY

The following relates to a method of protecting a converter of a wind turbine, wherein the converter is coupled to a generator of the wind turbine to perform conversion of electrical power produced by the generator, and to a protection system. The following further relates to a respective computer program for providing protection of a converter of a wind turbine.

BACKGROUND

Variable speed wind turbines comprise a generator that converts mechanical power provided by the rotating shaft of the wind turbine into electrical power, the frequency of which is adjusted to the grid frequency by means of a power converter (abbreviated as 'converter' herein). For example, wind turbines can be equipped with a doubly fed induction generator (DFIG). The stator of such DFIG is connected to the grid without any intervening frequency converter (it is generally coupled to the grid via a transformer), whereas the rotor of the DFIG is connected to the grid via the power converter. Such configuration has several benefits. Only a fraction of the produced electrical power needs to be handled by the power converter, thus reducing its size and costs. Also, the generator itself is generally more cost-efficient than a permanent magnet generator (PMG) used in a full converter topology in which the power converter manages the total active power generated by the wind turbine and thus acts as an interface between the generator and the grid. On the other hand, in the DFIG configuration, the stator of the generator is connected to the grid and therefore experiences any transients present on the grid, in particular transients resulting from faults on the grid. Such transients can cause large overcurrents in the generator and, in particular as a consequence of the inductive behavior of the generator, can damage the power converter coupled to the rotor of the generator. In full converter topologies, such transients are only experienced at the grid side of the power converter, but are not transmitted to the generator.

The grid transients can cause overcurrents inside the power converter than can damage components of the power converter, in particular semiconductor components such as semiconductor switches provided for rectification and inversion of the electrical power. To avoid damage to semiconductor components, they can be equipped with an internal temperature sensor to measure the junction temperature of the semiconductor component. The measured junction temperature is however only valid for stationary operation, since the temperature measurement has a relatively slow response time. Accordingly, when a hard transient occurs on the grid, the resulting overcurrent can cause a significant increase of the junction temperature that goes undetected and may cause destruction of the semiconductor component. The power converter may thus be damaged and operation of the wind turbine may have to be stopped.

Effective protection strategies are difficult to implement for such situations, since the converter rotor currents can exceed the operational range of current sensors significantly. The operating range of the current sensors cannot be extended indefinitely, due to the loss in measurement accuracy at stationary conditions which is required to achieve a good converter control performance. As the converter rotor currents can exceed the nominal semiconductor currents and current sensor operational ranges during several milliseconds during a transient, the respective current measurements are generally not suitable for implementing an efficient protection strategy for protecting the semiconductors from overloading.

Furthermore, it is generally desirable in DFIG systems to increase the power produced, resulting in an increase of converter and generator currents. Such tendency makes the above outlined problems even more prominent. It is therefore desirable to device an improved protection strategy for protecting a converter of such wind turbine. In particular, it is desirable to prevent that semiconductor components of such converter are damaged due to transients occurring on the power grid, in particular in a DFIG configuration. It is also desirable that when providing such efficient protection, the output power of the wind turbine can still be maintained at a relatively high level.

SUMMARY

There is accordingly a need to mitigate at least some of the drawbacks mentioned above. In particular, there is a need to improve the protection of a converter from overcurrents that are caused by transients occurring on the power grid.

According to an embodiment of the invention, a method of protecting a converter of a wind turbine is provided. The converter is coupled to a generator of the wind turbine to perform a conversion of electrical power produced by the generator. The converter comprises plural semiconductor components that are operational to provide the conversion of the electrical power. The method comprises performing a (iteration) step of estimating a junction temperature of at least one of the semiconductor components. The estimating step is performed by determining a current in the converter that is associated with power loss in one or more of the plural semiconductor components; estimating power loss associated with the one or more semiconductor components based on the determined current and on the state of the one or more semiconductor components; and using a thermal model of the one or more semiconductor components to estimate the junction temperature of at least one of the one or more semiconductor components based on the estimated power loss. The (iteration) step of estimating the junction temperature is repeatedly performed. A time period corresponding to a step size between subsequent steps of estimating the junction temperature is smaller than $1/10$ of the period of an AC voltage output by the converter. The method further comprises triggering a protection mechanism that is configured to reduce the junction temperature of the at least one semiconductor component if the estimated junction temperature exceeds a predetermined temperature threshold.

By means of such method, the junction temperature may be estimated significantly faster than what is achievable by conventional temperature sensors. It may essentially be estimated in real-time. Furthermore, due to the small step size of the estimating step, the alternating currents can be regarded as constant over the time period corresponding to the step size, thus significantly facilitating the estimation of the junction temperature. A real-time estimation of the junction temperature of one or more semiconductor components of the converter of the wind turbine thus becomes possible.

The power loss associated with the one or more semiconductor components generally relates to the power dissipation in the respective semiconductor component, i.e. to the conduction losses and the switching losses occurring in the semiconductor component. Correspondingly, the state of the one or more semiconductor components refers to the switching state, i.e. it may indicate the presence of an off state (blocking state) for a certain time period, the presence of an on state (conducting state) for a certain time period, a switching from on-state to an off-state, a switching from an off-state to an on-state, or any combination thereof, as generally occurring when operating a respective converter having power electronic components for providing controlled rectification or inversion of electrical power.

The one or more semiconductor components may form part of a generator side converter stage of the converter that may in particular be connected to a rotor of the generator. The junction temperature may be estimated for each of the semiconductor components of the rotor side converter stage.

The converter is a three-phase converter and the generator is a doubly fed induction generator (DFIG). The input of the converter may be connected to a rotor of the doubly fed induction generator.

The determining of a current in the converter comprises the determining of an operating current in the converter that is indicative of the current through the at least one semiconductor component. The operating current of the converter may be measured if the operating current lies within a working range of a respective current sensor and the operating current may be estimated based on operational parameters of the converter if the operating current lies outside the working range of the current sensor. In particular, for a three-phase converter, a respective current sensor may be provided for each phase of the converter, in particular for each phase of a generator side converter stage of the converter that is connected to a rotor of the generator. The current (rotor current) may thus be measured for a respective phase at the generator side input of the converter. The input for the respective phase may then be connected to a respective converter leg of the generator side converter stage in each of which one or more of the semiconductor components are connected. The operating current may thus be (substantially) equal to the current through the respective semiconductor component.

By such configuration, it can be ensured that the operating current for estimating the junction temperature of the semiconductor component is available even though the operating current may be outside of a range of the respective current sensor. Accordingly, if a transient occurs on the power grid, resulting in an overcurrent in the rotor of the generator, the respective current that is experienced by the power converter can still be obtained (although the sensor is out of range). Also in such situations, a reliable estimation of the junction temperature of the semiconductor component becomes possible and a respective protection mechanism can be activated.

In an embodiment, the converter is a three-phase converter having a grid side converter stage (generally operating as an inverter) and a generator side converter stage (generally operating as a rectifier). If the operating current for one phase of the generator side converter stage lies outside the working range of the respective current sensor, the operating current is estimated from the operating current that is measured for each of the other two phases of the generator side converter stage, i.e., the operational parameters of the converter from which the current lying outside the sensor range is estimated include the operating currents measured for the other two phases.

If the operating currents for two phases of the generator side converter stage lie outside the working range of the respective current sensors, then the operating current for at least one of these two phases is estimated based on a current on a DC-link of the converter, in particular based on a current balance on the DC-link of the converter. In particular, in-flowing and out-flowing currents on the DC-link may be considered in order to estimate the operating current for one of the two phases. The larger of the two unknown currents is estimated based on the current balance on the DC-link. The estimation may be based on Kirchhoff's law. For example, if the largest unknown current is in-flowing into one node of the DC-link, all out-flowing currents from that node of the DC-link can be used to estimate the unknown largest current, which may involve respective grid voltage and current measurements as well as DC-link voltage measurements.

In particular, if the operating currents for two phases of the generator side converter stage lie outside the working range of the respective current sensors, the operating current may be estimated for the phase for which the operating current is the largest of the three phases. This may for example be known from the direction of the current that is within range of the respective current sensor, wherein the largest current is the current having the opposite sign. Estimating the largest operating current based on a current on the DC-link of the converter may include determining a current towards a DC-link capacitor of the DC-link, determining a current towards the grid side converter stage and possibly, if present, determining a current through a chopper stage of the converter. It should be clear that the respective estimation can be made for either direction of the current flow, i.e., into or out of the respective converter input for the respective phase.

The operational parameters of the converter for determining said largest operating current may include the DC-link voltage, a capacitance value of the DC-link capacitor, a chopper resistance of the chopper stage, an on/off state of the chopper stage; as well as voltage and current on the grid side of the converter, e.g., at the converter output connected to the power grid. For example, the current towards the DC-link capacitor may be determined based on a fixed capacitance value and a continuous measurement of the DC-link voltage. The current can be determined proportionally to the voltage change and capacitance. The current through the chopper stage may be determined from the DC-link voltage measurements, the chopper on/off state and a value of the chopper resistance. The current towards the grid side converter stage of the converter may be determined from the active grid power, in particular from the voltage and current measurements on the output of the grid side converter stage.

Based on the above-mentioned operational parameters of the converter, it thus becomes possible to efficiently and reliably determine the largest current at the input to the grid side converter stage even though it may exceed the operational range of the current sensor significantly. As the respective current is the most important current in view of the increase of the junction temperature of the semiconductor components, its determination allows an efficient protection of the respective semiconductor components by estimation of the junction temperature as outlined above and further below. From the measured current for one phase and the determined largest current for a second phase, the current present in the third phase, which is also out of range, can be obtained. The third current can be obtained from a simple current balance, since the three-phases of the rotor are generally delta connected. In this respect, it is noted that a situation in which the currents for all three-phases are out of the sensor range does generally not occur. First, the current sensor range extends up to significant values, such as 5,000 amperes or 7,000 amperes, so that for all three currents to be outside the range, the largest current would need to exceed 14,000 amperes. Other protection mechanisms will generally be triggered in such situation.

In an embodiment, the step size between subsequent steps of estimating the junction temperature corresponds to a time period smaller than 2 ms (milliseconds) or 1 ms, desirably smaller than 500 μs (microseconds), more desirably smaller than 200 μs. For example, the time period may lie in a range between 20 and 200 μs, in particular between 50 and 150 μs. For example, the time period may be about 100 μs, such as 80, 90, 100, 110 or 120 μs. By using such time period as the step size, a real-time estimation of the junction temperature becomes possible. Further, as outlined above, the AC-currents can be regarded as constant over such time periods, which simplifies junction temperature estimation.

The power loss associated with the semiconductor component may be dependent on the junction temperature of the semiconductor component. When estimating the power loss associated with the one or more semiconductor components, a junction temperature determined in a preceding step of estimating the junction temperature may be employed.

Generally, the estimation of the junction temperature may be performed iteratively, and the junction temperature estimated in a preceding estimation step may be employed in the current estimating step. The estimation may be initialized by using an ambient temperature as an initial value of the junction temperature, or by using a predetermined (e.g. 25° C.) or a typical average operating temperature value. When operating under normal conditions, the estimation of the junction temperature will converge within a short period of time and provide thereafter a real-time estimation of the junction temperature of the one or more semiconductor components.

Estimating the power loss associated with the one or more semiconductor components may comprise determining one or more operating states of the one or more semiconductor components during the time period and determining the power loss from the power loss associated with each of the one or more operating states of the one or more semiconductor components during the time period. For example, a semiconductor switch, such as an IGBT, may have switching losses when turning on and turning off the semiconductor switch, and may have further conduction losses when the semiconductor switch is in an on-state and conducting current. Blocking losses are generally low and thus do not need to be considered. A diode may for example have a conducting state and a blocking state, and again, blocking losses are relatively low and do not need to be considered.

By considering the semiconductor states, and in particular the switching losses and the conduction losses, in accordance with the duty cycle, a precise estimation of the power losses associated with the one or more semiconductor components can be obtained. The switching losses and the conduction losses can be precisely estimated. The estimation may be performed individually for each semiconductor component (based on the individual operating states and current during the time period), or an overall estimation of the total power loss associated with all semiconductor components may be made. Such estimation may be made by employing the current for each phase leg of the respective converter stage, for example by separately considering the currents in the three legs, one for each phase, of the rotor side converter stage.

To facilitate the determination, only the largest current may be considered, and the estimation may be made only on the basis of the largest current, for example for the respective phase leg of the converter stage, or for all phase legs of the converter stage. Simplification of the estimation of the power losses can thus be achieved, thus reducing the computational effort required for a real-time determination of the junction temperature. For example, the power losses may be estimated independently for the rotor side converter stage of the converter. An overall estimation of the switching losses for the rotor side converter stage may be based on the number of semiconductor components, the number of switching events (turn-ons and turn-offs of all devices), the DC-link voltage, and the largest current input to the rotor side converter stage. The respective switching loss determined as an overall value for all semiconductor components may then be assigned to each semiconductor component (i.e., the respective fraction of the overall switching loss). A simple and efficient method of estimating the switching losses may thus be achieved.

Similarly, for the conduction losses, the overall conduction losses for the rotor side converter stage may be determined based on the largest current input into the rotor side converter stage (which, as mentioned above, may be an in-flowing or out-flowing current). The conduction losses can then again be assigned to each semiconductor component.

However, it is desired that for each semiconductor component, the individual current through it and its switching state are considered individually and separate from the other semiconductor components, so that the switching losses and power losses for each semiconductor component can be determined very precisely.

In an embodiment, the at least one semiconductor component comprises or is a semiconductor switch, in particular an insulated gate bipolar transistor (IGBT), wherein the power losses include at least switching losses and conduction losses of the semiconductor switch during the time period. The junction temperature may also be determined for a diode, or for each of plural semiconductor components including both semiconductor switches and diodes.

The plural semiconductor components comprise plural modules each including a semiconductor switch and a diode, wherein the junction temperature is separately estimated for the semiconductor switch and the diode. When performing the estimation step, only the largest of the two junction temperatures estimated in the preceding estimation step for such module may be employed, thus improving the safety margin of the estimation.

The thermal model of the semiconductor component may be a Foster model or a Cauer model. The respective model may be configured to consider the thermal impedance from the junction of the semiconductor component to ambient temperature. Such model may for example be constructed for the different layers of a semiconductor component module comprising the semiconductor component, such as an IGBT module, which may include only an IGBT or may include an IGBT and a diode, such as a free-wheeling or body diode. The thermal model may thus include both an IGBT and a diode and may consider the power dissipation in the respective semiconductor component as a heat source.

The thermal model may consider a temperature of an ambient medium to which the semiconductor component is exposed. The method may further comprise the obtaining of the temperature of the ambient medium. The ambient medium may for example be a cooling fluid, such as water, provided for cooling the semiconductor component. The temperature of the ambient medium may for example be measured. The ambient medium may be a cooling liquid that may cool directly a base plate of a semiconductor module of the respective semiconductor component or may cool a heat sink of such semiconductor module. The thermal model may be adapted accordingly to consider such heat sink, and possibly thermal grease between such base plate and the heat sink.

In an embodiment the power losses are estimated separately for a generator side converter stage and a grid side converter stage of the converter. The power losses may be estimated only for the generator side converter stage, in particular for the rotor side converter stage.

The power losses may be estimated based on the largest current for the respective converter stage and the switching states of the semiconductor components, in particular of all the switched semiconductor components, of the respective converter stage (i.e. the semiconductor components concerned with the conversion of electrical power). Accordingly, an overall power loss may be estimated for the respective converter stage. The determined power loss may then be assigned to each semiconductor component of the respective converter stage. The calculation is thus simplified, allowing a fast and essentially real-time estimation of the junction temperature. The overall switching losses may for example be determined in dependence on the number of semiconductor components, the total number of the switching events (the number of state changes for all devices of the converter stage), the voltage on DC-link of the converter and the estimated largest current. These switching losses may then be assigned to each semiconductor component. Similarly, an overall value may be determined for the conduction losses of the semiconductor components.

The determining of the current comprises the determining of the current through each of the one or more semiconductor components, wherein the power losses are estimated individually for each of the one or more semiconductor components based on the current through the respective semiconductor component and the switching state of the respective semiconductor component. The junction temperature may be estimated for each of the one or more semiconductor components based on the power loss estimated for the respective semiconductor component. The estimation of the junction temperature may further be based on a previously estimated junction temperature for the respective semiconductor component, or for an associated semiconductor component (e.g., for a semiconductor component on same module).

The triggering of a protection mechanism may in particular involve the reduction of the current through the respective semiconductor component. As an example, the triggering of a protection mechanism may comprise at least one of opening one or more circuit breakers associated with the operation of the converter, activating a crowbar stage coupled to the converter, in particular coupled to a generator side of the converter, and delaying switching of semiconductor components of the converter. By such measures, the current flow through the semiconductor component can be reduced or may be stopped.

For example, by making use of the crowbar stage, the currents in the generator side converter stage can be reduced very quickly, avoiding a further rise of the junction temperature. Similarly, by delaying further switching of the semiconductor components, in particular switching to the conductive state (on-state), the junction temperature is allowed to drop down to values at which the semiconductor component is safe to operate. The crowbar stage may for example include a passive crowbar. The crowbar may be coupled to a connection between the rotor of the generator and the converter input of the generator side converter stage. The one or more protective measures may be taken while the wind turbine remains connected to the grid. Accordingly, the wind turbine can continue to feed power into the grid after the transients have passed and the currents in the rotor have returned to nominal, so that the protective measures are no longer required.

Opening of respective circuit breakers interrupts the current flow through the converter and thus also reduces the junction temperature of the semiconductor component. By opening the circuit breakers, the wind turbine may become disconnected from the power grid.

According to a further embodiment, a protection system for protecting a converter of a wind turbine is provided. The converter is coupled to a generator of the wind turbine to perform conversion of electrical power produced by the generator. The converter comprises plural semiconductor components that are operational to provide the conversion of the electrical power. The protection system comprises a controller that is configured to perform a step of estimating a junction temperature of at least one of the semiconductor components. The step of estimating a junction temperature of at least one semiconductor component comprises determining a current in the converter that is associated with the power loss in one or more of the plural semiconductor components; estimating power loss associated with the one or more semiconductor components based on the determined current and on the state of the one or more semiconductor components; and using a thermal model of the one or more semiconductor components to estimate the junction temperature of at least one of the one or more semiconductor components based on the estimated power loss. The step of estimating the junction temperature is repeatedly performed, wherein a time period corresponding to a step size between subsequent steps of estimating the junction temperature is smaller than $1/10$ of the period of an AC-voltage output by the converter. The controller is furthermore configured to trigger a protection mechanism that is configured to reduce the junction temperature of the semiconductor component if the estimated junction temperature exceeds a predetermined temperature threshold.

By such protection system, advantages similar to the ones outlined further above may be achieved. In particular, such protection system allows a real-time estimation of the junction temperature and furthermore provides a fast reaction that reduces the junction temperature so that damage to the converter can be prevented.

The protection system may comprise the converter, and the converter may be a three-phase converter that is coupled to a rotor of the generator. The protection system may further comprise three current sensors coupled to the input of the converter at a generator side of the converter. Each current sensor may have a respective predetermined working range, which is the same for the three sensors. The determining of a current associated with power loss in the semiconductor component may comprise measuring the current for at least one phase of the converter using the respective current sensor. As outlined in detail above, the controller may be configured to estimate one of the three currents, in particular the largest current, based on operating parameters of the converter, in particular if the current is outside the operating range of the respective current sensor for two of the phases. As further mentioned above, the controller may be configured to estimate one of the currents from the remaining two currents if only the current of one phase is out of the operating range of the respective current sensor.

In particular, the controller may be configured to perform any of the above outlined method steps. Furthermore, the protection system may comprise any of the elements described herein, such as the converter including the generator side converter stage, the DC-link and the grid side converter stage; the crowbar stage; a sensor for measuring DC-voltage on the DC-link; a sensor for measuring AC-current and AC-voltage on the grid side output of the converter; circuit breakers for disconnecting the converter; and the like. The protection system may furthermore include the generator, which may in particular be a doubly fed induction generator.

For example, at an output frequency of 50 Hz, the period of the AC voltage is 20 ms, so that the time period may accordingly be shorter than 2 ms.

According to a further embodiment, a wind turbine comprising a protection system in any of the above outlined configurations is provided. The wind turbine may in particular include the generator, the converter, and the converter controller, and may further include any of the other components described herein with respect to a wind turbine.

According to a further embodiment of the invention, a computer program product (non-transitory computer readable storage medium having instructions, which when executed by a processor, perform actions) for protecting a converter of a wind turbine is provided. The computer program may comprise control instructions which, when executed by a data processor of a controller of the converter, cause the data processor to perform any of the methods described herein, in particular any of the above described embodiments of the method of protecting a converter.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein.

DETAILED DESCRIPTION

Figure 1:
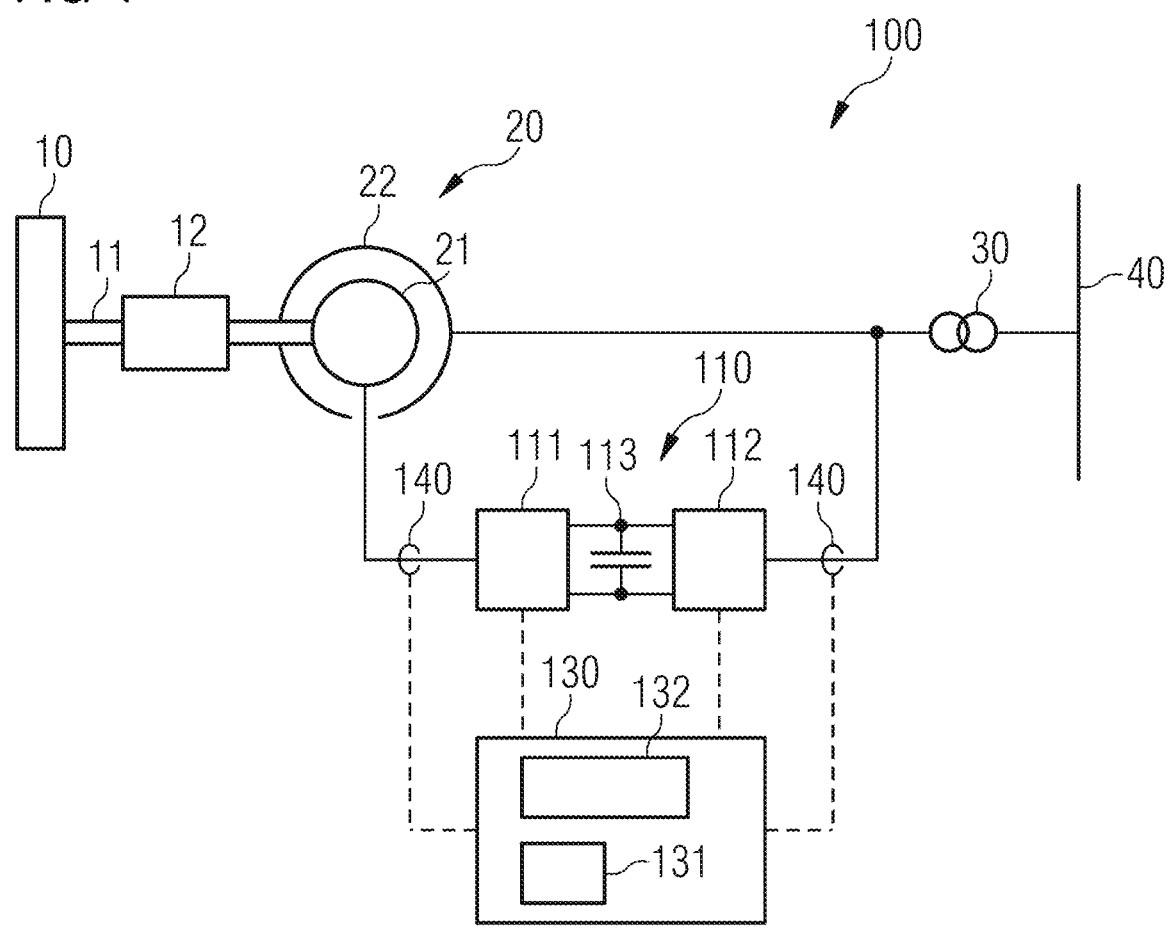
FIG. 1 is a schematic drawing showing a protection system of a wind turbine according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically shows a wind turbine that includes a protection system 100 according to an embodiment. The wind turbine has a rotor with a hub 10 that is coupled to a shaft 11. The rotor converters wind energy into rotational mechanical energy. The shaft 10 is coupled to a generator 20 via a gearbox 12. It should be clear that in other configurations, gearbox 12 may not be present (e.g., a direct drive wind turbine). In the embodiment of FIG. 1, the generator 20 is a doubly fed induction generator (DFIG), but embodiments employing different types of generators are also conceivable. The shaft 11 is in particular coupled via the gearbox 12 to the rotor 21 of the DFIG to turn the rotor. The stator 22 of the generator 20 is electrically connected to a power grid 40 via a transformer 30. It should be clear that the respective connection may include further components not shown in FIG. 1, such as circuit breakers or the like.

The rotor 21 is electrically connected to an input of a converter 110 of the wind turbine. The converter 100 includes a generator side converter stage 111 that is connected to the rotor 21, and a grid side converter stage 112 that is connected to the power grid 40 (via the transformer 30). Both converter stages 111, 112 are coupled via a DC-link 113. Both converter stages 111, 112 are operable as a rectifier or as an inverter to allow power flow in either direction through the converter 110. The converter 110 may in particular be configured to feed an adjustable frequency AC power to the field windings of the rotor 21 to allow the generator to operate at variable speed while providing AC power at the desired frequency at the output of stator 22. In operation, a fraction of up to 20% or 30% of the generated electrical power is fed to the power grid via the converter 110, the remaining electrical power being directly fed to the grid from the stator 22. The general operation of a DFIG is known to the skilled person and thus not explained in greater detail herein.

Each converter stage comprises plural semiconductor components 150 that are operable to provide the desired conversion of electrical power. These include in particular semiconductor switches, such as IGBTs. A converter controller 130 is provided for controlling the semiconductor components, for example by using a pulse width modulation (PWM) control scheme. Converter controller 130 may accordingly include respective control connections to the semiconductor components 150, in particular to IGBT modules, of the converter 110. Current sensors 140 are furthermore provided to measure current at an input to the converter 110 (i.e. rotor currents) and at an output of the converter 110 (i.e. currents of the AC power provided to the power grid). It is noted that although converter 110 can be operated bi-directionally, the connection towards the rotor 21 is termed input herein, whereas the connection towards the grid 40 is termed output of the converter 110.

Converter controller 130 comprises a processing unit 131 such as a microprocessor, FPGA, PLD (Programmable Logic Device), or DSP (digital signal processor), and a memory 132 (such as RAM, ROM, flash memory or a hard disc drive) that stores control instructions which when executed by the processing unit 131 perform any of the methods described herein. The processing unit 131 in particular operates the converter 110 so as to provide the desired power conversion and the desired AC frequency at the output of the stator 22. The converter controller 130 can certainly include further inputs to receive further information, such as an input for a temperature sensor for receiving the measurement of an ambient temperature and/or a temperature of a cooling medium, such as cooling liquid, for cooling the semiconductor components of the converter 110. Further, inputs for receiving measurements of the DC voltage on the DC link 113, of the AC voltage at the output of converter 110 and the like may be provided. Furthermore, the converter controller 130 may be coupled to or may implement a wind turbine controller that controls the operation of the wind turbine. Such wind turbine may for example set the output power to be fed into power grid 40 based on the prevailing wind conditions by providing a torque setpoint in accordance with which the converter 110 and thus the generator 20 are controlled. It may further control the pitch angle of the blades attached to hub 10 to adjust the conversion efficiency of wind energy into rotational energy, thereby adjusting rotor speed and/or torque.

Converter controller 110 is configured to perform a method of protecting the converter 110 of the wind turbine. According to this method, the converter controller 110 estimates the junction temperature of one or more semiconductor components of the converter 110 and triggers a protection mechanism if the junction temperature exceeds a threshold value.

The junction of a semiconductor component generally refers to the junction between n-type and p-type semiconductors in the component, wherein a component such as an IGBT can comprise several alternating layers of such semiconductors. The junction temperature refers to the highest temperature occurring in a semiconductor device during operation, which is generally found in proximity to the one or more junctions in the device through which the current is conducted.

The protection system 100 includes the converter controller 130. It may further include the current sensor 145 at the input of the converter 110. Optionally, it may further include the converter 110 and the current sensor 140 at the output of the converter. In some embodiments, it may further include the generator 20.

Figure 4:
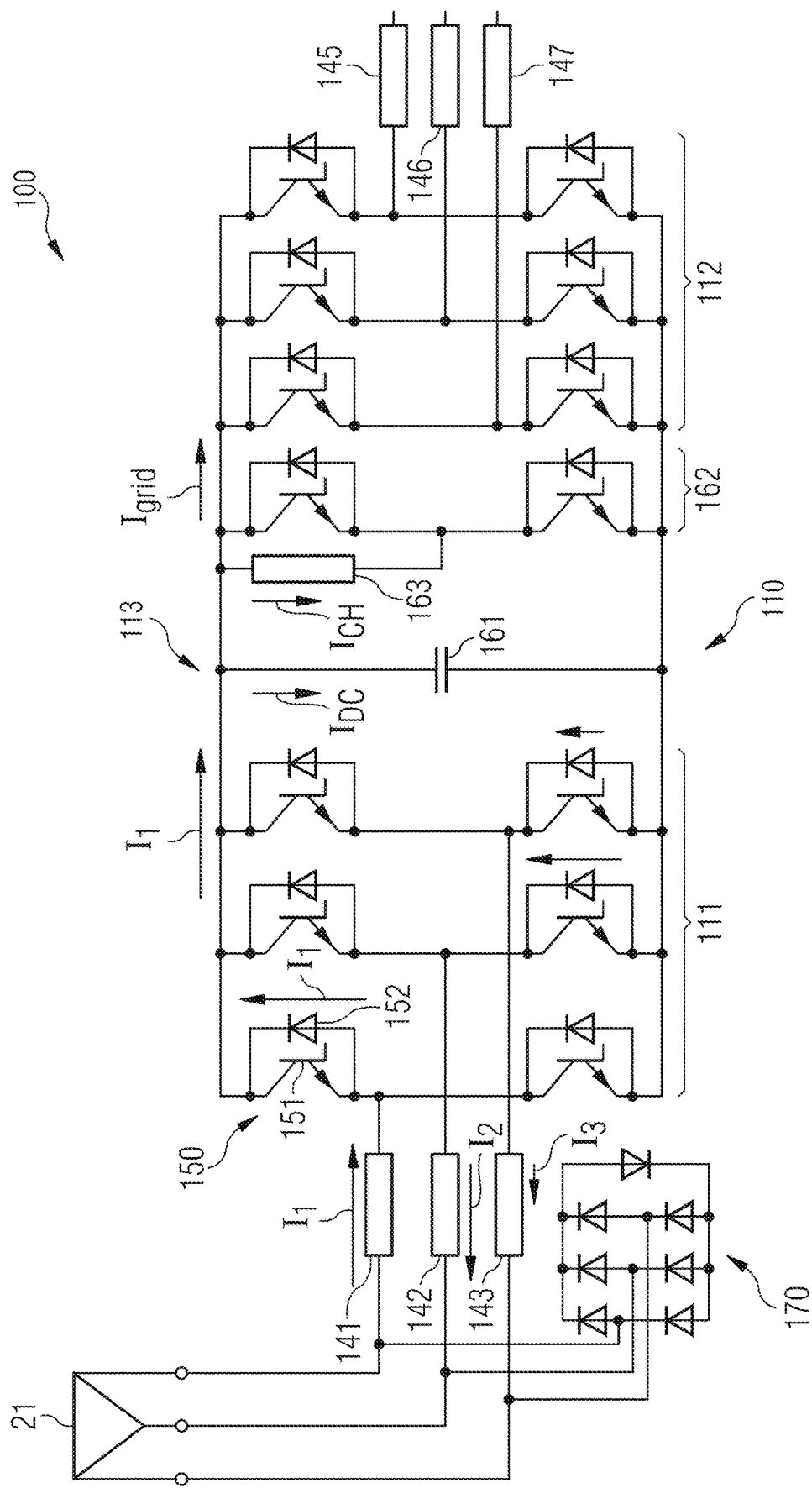
FIG. 4 is a schematic drawing showing currents in a converter according to an embodiment of the invention.

An exemplary implementation of the converter 110 is shown in FIG. 4. As can be seen, the converter is a three-phase converter having three inputs (one for each phase) at which respective current sensors 141, 142 and 143 are provided. Furthermore, current sensors 145, 146 and 147 are provided at each of the three phases of the output of converter 110.

Both, the generator side converter stage 111 and the grid side converter stage 112 include three converter legs comprising semiconductor components that are switched (by converter controller 130) to effect the desired conversion of electrical power. In the example shown in FIG. 4, each converter leg comprises two semiconductor modules, each module comprising semiconductor components in form of a semiconductor switch 151, in particular an IGBT, and a diode 152. IGBT 151 and diode 152 may for example form part of an IGBT module. It should be clear that other converter topologies are conceivable, for example by connecting more than two semiconductor modules in series in each leg, by providing series-connected converter cells that are each fed from the three-phase input or the like.

The converter further includes the DC link with the DC link capacitor 161. Further, a chopper stage 162 is provided and includes the chopper resistance 163 as well as respective semiconductor switches for connecting the chopper resistance 163 into the DC link circuit. To the input to the converter 110, a crowbar stage 170 is connected. The crowbar can be a passive crowbar, but an active crowbar may be used as well.

Figure 2:
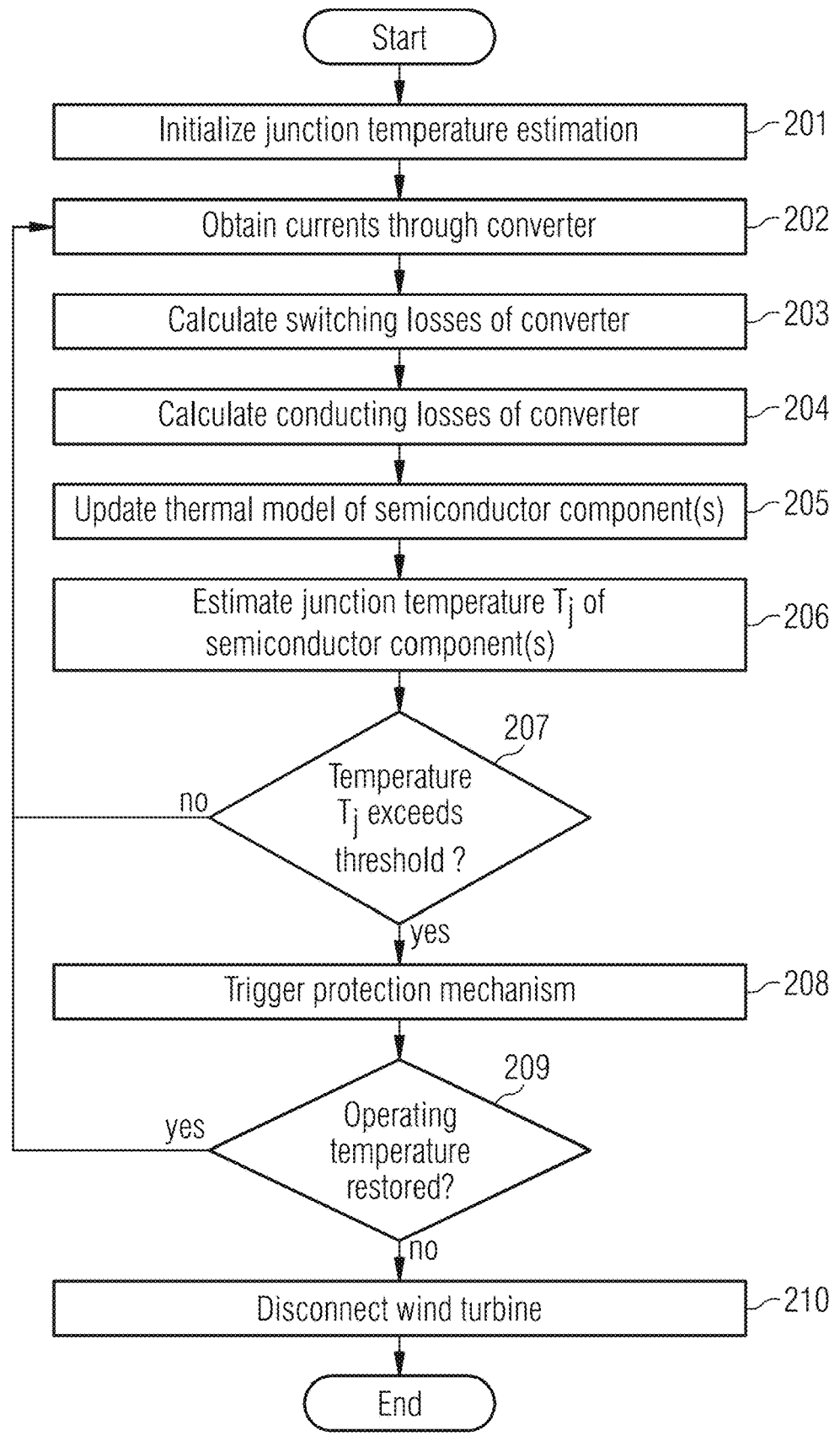
FIG. 2 is a flow diagram illustrating a method according to an embodiment of the invention.

FIG. 2 is a flow diagram showing a method of protecting a converter of a wind turbine, in particular the converter 110, according to an embodiment. The method involves the estimation of the junction temperature of at least one semiconductor component 150 of the converter 110. The junction temperature of each semiconductor switch 151 of the generator side converter stage 111 is estimated. In an embodiment, the junction temperature of both semiconductor switches 151 and diodes 152 which are operable to provide the power conversion in the generator side converter stage 111 are estimated.

In the example of FIG. 2, the converter is a three-phase converter coupled at its input to the rotor 21 of a DFIG, as shown in FIG. 1. The above explanations thus equally apply to the embodiment of FIG. 2.

In step 201, the junction temperature estimation is initialized. For example, parameters that are determined during the estimation may be given a present initial value, e.g., the ambient or a predetermined temperature may be used as an initial value for the junction temperature (e.g., 25° C.). The method performs repeated (iteration) steps of estimating the junction temperature, wherein the resulting estimated junction temperature is used in the subsequent step. The method may thus employ an iterative process for estimating the junction temperature.

The step size between subsequent (iterative) steps is predetermined and is smaller than 1/10 of the period of the converted AC voltage given out at the output of the converter 110 (i.e. on the grid side). It can thus be ensured that the currents remain relatively constant over one cycle or step, which allows simplification of the estimation. Furthermore, a real time estimation thus becomes possible, i.e., there is only a short a very delay between the actual junction temperature and the obtaining of the result of junction temperature estimation.

In step 202, currents in the converter are obtained. In particular, when applied to the generator side converter stage 111, the currents for the three phases are measured at the input to the converter 110, in particular by a current sensor 141, 142 and 143 for each phase (as shown in FIG. 4). Each current sensor 141, 142 and 143 has a particular operating range in which precise current measurements can be made. Outside the operating range, current measurements are no longer indicative of the current in the respective connection or are not possible.

If in step 202, one of the currents is outside the operating range of the respective sensor 141, 142 and 143, the current for this phase is estimated based on operating parameters of the converter 110, in particular based on the currents measured for the other two phases. This is possible, since in the rotor 21, the field windings are generally delta-connected, as shown in FIG. 4, so that Kirchhoff's law can be employed to derive the third current. All three currents can accordingly be obtained.

If in step 202, two of the current sensors are out of range, the larger of these two currents is determined based on operating parameters of the converter 110. If two currents are out of range, their values must have opposite sign, i.e. they flow into different directions. Referring to FIG. 4, it can be seen that the largest of these currents (here $I_1$) is the current with the sign opposite to the sign of the current that has the smallest value and that can still be measured by the current sensor (here current $I_3$ measured by 143). This is due to the fact that the sum of these three currents must be equal to zero. The direction/sign of the respective current can be determined by the respective current sensor 141, 142 and 143 (e.g. for the current in range) and can be derived from the operating state of the converter 110 for the other currents (which is known to converter controller 130 that controls the switching state of the converter 110).

As shown in FIG. 4, the current is experienced by one or more semiconductor components connected in the respective leg of the converter 110. $I_1$ is for example experienced by the semiconductor switch 151, in particular an IGBT, or the diode 152, depending on the switching state/operating state of the converter 110. As shown for the operating state of FIG. 4, the current $I_1$ is thus present on the DC link 113. The value of $I_1$ is now derived by considering the currents on the DC link.

The current $I_{DC}$ into the DC link capacitor 161 is derived based on the fixed value of the capacitance, which is known, and the DC Link voltage. A respective sensor can be provided to allow controller 130 to continuously measure the DC link voltage. Based on the DC link voltage and voltage change, the current into the DC link capacitor 161 can be derived.

The current $I_{CH}$ through the chopper stage is derived based on the fixed value of the chopper resistance 163, which is known, the measured DC-link voltage, and further based on the ON or OFF state of the chopper stage 162, which is controlled by the controller 130 and thus also known.

The current $I_{grid}$ that flows in or out through the grid side converter stage 112 (operating as inverter) is known from the active power provided to the grid. The active power is known from the grid current and voltage measurements, e.g., using sensors 145, 146 and 147. In particular, the AC voltage and current at the output of converter 110 are measured and are used to derive $I_{grid}$.

From the sum of these three currents, the current $I_1$ which is out of range is determined. In particular, the three determined currents $I_{DC}$, $I_{CH}$, and $I_{grid}$ are averaged and summed to obtain $I_1$, i.e. the larger of the two currents out of range. Once $I_1$ is known, the second current $I_2$ that is out of range can be obtained, since the sum of the three currents $I_1$, $I_2$ and $I_3$ equals zero.

Even though two of the rotor currents are out of range of the respective current sensors 141, 142 and 143, the present method allows a precise estimation of all three currents. In particular during the occurrence of transients on the power grid, which may be due to a fault occurring on the grid and which result in overcurrents in the rotor 21, the currents experienced by the converter 110 can be obtained with relatively high precision. This is not possible in conventional methods where a wind turbine is simply shut down if the currents are out of range of the respective current sensors.

In accordance with the above, it should be clear that it depends on the value of the currents which method is used to obtain the currents in step 202, in particular on whether one or two of the currents are out of range.

In steps 203 and 204, the switching losses and the conduction losses occurring in the one or more semiconductor components are determined. For each of the semiconductor components of the generator side converter stage 111, the switching state during the time period of the iteration step is known (since the converter controller 130 controls the switching states) and the current through each semiconductor component is known from the preceding step 202. Accordingly, it is possible for the converter controller 130 to calculate the switching losses and the conduction losses for each individual semiconductor component.

In particular, the converter controller has available the currents through the semiconductor component and the switching states of the semiconductor components, and further measures the DC link voltage. For each semiconductor component, such as an IGBT or a diode, the manufacturer provides data that allows the derivation of the conduction and switching losses. For an IGBT, the conduction losses are derived from a curve of collector-emitter voltage $V_{CE}$ versus collector current $I_C$. An exemplary equation for deriving the conduction losses is given below.

For a diode, the conduction losses are derived from a curve of forward voltage Vf versus forward current $I_f$ given by the manufacturer.

Similarly, the switching losses are derived from manufacturer data as a function of the DC link voltage, the respective current through the semiconductor component and the junction temperature. Since the method is iterative, the junction temperature determined in the preceding step for the semiconductor component is employed for determining the switching losses. The curves used to derive the switching and conduction losses may be approximated by a simple analytical expression to facilitate and accelerate the determination of the respective losses.

The determination of the switching losses and the conduction losses of a semiconductor component is generally known to the skilled person and thus not explained in greater detail here. In particular with respect to the determination of the switching losses and the conduction losses of a diode or an IGBT, reference is made to the Semikron "Application Manual Power Semiconductors", second edition, available under "https://www.semikron.com/dl/service-support/downloads/download/semikron-application-manual-power-semiconductors-english-en-2015.pdf", which describes the respective determination in detail. The document is incorporated herein by reference in its entirety. In particular, the determination of the conduction losses and the switching losses of the IGBT can be based on the following formulas given in the manual.

For a reference temperature of 25° C. and a predetermined reference current $I_{ref}$ and reference voltage $V_{ref}$ (reference values of the switching loss measurements taken from the datasheet of the manufacturer), the conduction losses $P_{cond(T)}$ and switching losses $P_{sw(T)}$ for an IGBT (indicated by index T for transistor) can be determined based on the following equations:

$$P_{cond(T)} = (I_{in} \cdot (V_{CE0(25° C.)} + TC_v \cdot (T_j - 25° C.)) + \quad \text{Equation (1)}$$

$$I_{in}^2 \cdot (r_{CE(25° C.)} + TC_r \cdot (T_j - 25° C.)))DC_{(T)}$$

$$P_{sw(T)} = f_{sw} \cdot E_{on+off} \cdot \left(\frac{I_{in}}{I_{ref}}\right)^{Ki} \cdot \left(\frac{V_{out}}{V_{ref}}\right)^{Kv} \cdot (1 + TC_{Esw} \cdot (T_j - T_{ref}))$$

wherein for the first equation relating to an IGBT (transistor T), $I_{in}$ designates the current through the IGBT; $V_{CE0(25° C.)}$ is a voltage given in the datasheet and used to derive temperature coefficients at different temperatures; $TC_V$ is the temperature coefficient of the on-state characteristic of the IGBT, $r_{CE(25° C.)}$ is the bulk resistance at the reference temperature of 25° C.; $TC_r$ is the temperature coefficient of the on-state characteristic related to conduction losses; $T_j$ is the junction temperature; and $DC_{(T)}$ is the transistor duty cycle, i.e. the time that the IGBT is conducting during the time period. For the second equation relating to the switching losses $P_{sw}$, $f_{sw}$ designates the switching frequency, which in the present case is 1 if switching occurred during the time period and is zero otherwise; $E_{on+off}$ designates a value derived from the datasheet in dependence on the switched current; Ki and Kv are exponents of the current and voltage dependency of the switching losses, respectively, which are obtained from the datasheet (Ki~1 and Kv~1.3 . . . 1.4); $TC_{Esw}$ is the temperature coefficient of the switching losses and $T_{ref}$ is a reference value of the switching loss measurements taken from the datasheet.

By knowing the switching state of the IGBT during the time period (step size of the iterative process), the current through the IGBT, the voltage on the DC link and the junction temperature (from the preceding iteration step), the switching losses and the conduction losses of the semiconductor switch can thus be derived without difficulty from the data given in a manufacturer's datasheet for the respective semiconductor component. It should be clear that respective equations can be derived from the manufacturer's datasheets for the diode. Further, it should also be clear that the equations can be adapted to the respective circuit configuration in which the semiconductor component is used.

Accordingly, from the available information, the switching losses and the conduction losses can be calculated for the converter, in particular the generator side converter stage, in steps 203 and 204. The switching losses and the conduction losses are determined individually for each semiconductor component, in particular for each diode and IGBT of the generator side converter stage involved in the conversion of the electrical power.

In steps 205 and 206, a thermal model of the semiconductor component is used to estimate the junction temperature $T_j$ of the semiconductor component. The thermal model may for example be a Cauer model or a Foster model, which is also termed partial-fraction circuit. In such models, a circuit of resistors and capacitors is used as an equivalent to the thermal setup of the semiconductor component. Whereas the Cauer model reflects the real physical setup of the semiconductor component, for which material characteristics of the individual layers have to be known, the Foster model does not represent the layer sequence but rather derives the coefficients of the model from a measured cooling curve of the semiconductor module.

Figure 5:
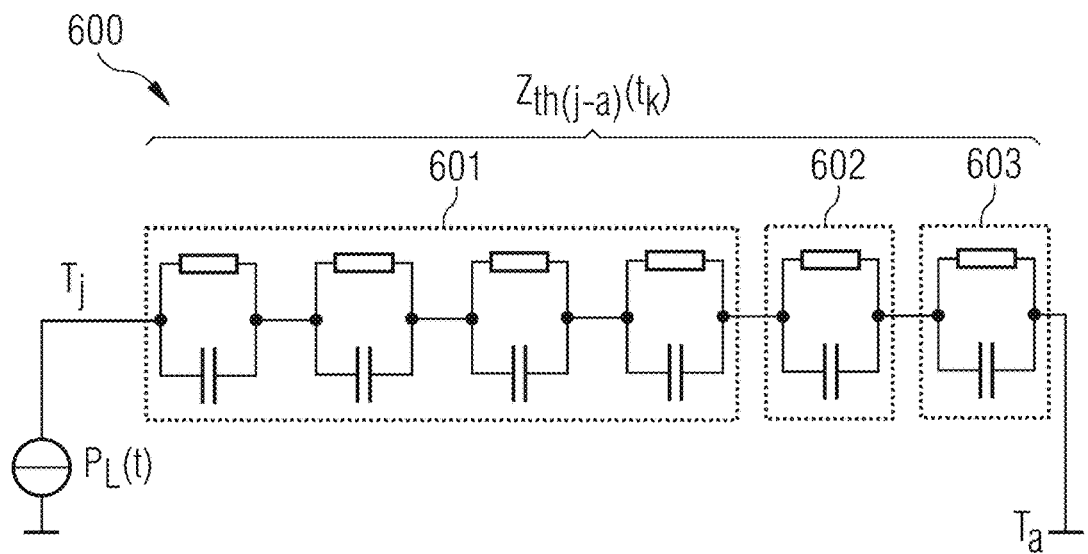
FIG. 5 is a schematic drawing showing a thermal model used in an embodiment of the invention.

A Foster model is employed as a thermal model for the semiconductor component. FIG. 5 illustrates a thermal model for a semiconductor component in form of a semiconductor switch. The model considers the thermal conduction from the semiconductor junction (junction temperature $T_j$) via the layers of the semiconductor module, the thermal grease and a heat sink that is exposed to an ambient temperature $T_a$. The heat sink is cooled so that the ambient temperature $T_a$ corresponds to a temperature $T_{cool}$ of a cooling medium, in particular of a liquid such as water.

In the thermal model of FIG. 5, reference numeral 601 designates the partial-fractional model for the IGBT or diode module, reference numeral 602 designates the partial-fractional model for the thermal grease and reference numeral 603 designates the partial-fractional model for the heat sink, which are combined into a system model. It should be clear that the thermal model depends on the particular configuration employed. For example, the base plate of the semiconductor module may be directly water cooled, in which case the models for the thermal grease and the heat sink can be removed. Also, it should be clear that a different number of circuit elements may be used to model the respective system component, e.g. an additional capacitor and resistor may be used to model the heat sink.

The model coefficients can generally be obtained from the datasheet provided by the manufacturer for the respective semiconductor component. The thermal impedance $Z_{th(j-a)}(t_k)$ of the model (from junction j to ambient a, wherein $t_k$ designates the time at iteration step k) may be determined based on an equation such as:

$$Z_{th}(t) = \sum_{i=1}^{n} r_i \left(1 - e^{-\frac{t}{\tau_i}}\right) \quad \text{Equation (2)}$$

wherein ri designates the i-th resistance of the model and τi=ri*ci designates the i-th time constant τ, wherein ci is the i-th capacitance of the model. On the manufacturer's datasheet, ri and τi are generally provided in tabular form for the thermal model of the respective semiconductor component, such as:

| i | 1 | 2 | 3 | 4 |
|---|---|---|---|---|
| $r_i$ | 0.8 | 4 | 13.2 | 1.5 |
| $\tau_i$ | 0.008 | 0.013 | 0.05 | 0.6 | for an exemplary model considering thermal conduction from junction to baseplate/case of an IGBT; n=4.

In FIG. 5, $P_L(t)$ designates the total power losses (including switching losses and conduction losses) of the respective semiconductor component at time t. It should be clear that the power losses refer to the dissipation of electrical power at the junction of the semiconductor component and accordingly provide heating of the junction, the thermal energy being conducted away from the junction in accordance with the thermal model and the thermal impedance $Z_{th}$. For each iteration step, the change in junction temperature can thus be determined from the thermal model (impedance $Z_{th}$) and from the total power losses $P_L(t)$. The following simplified equation describes the development of the junction temperature $T_j(t)$ for a known case temperature $T_C(t)$ and known total power losses $P_L(t)$:

$$T_j(t) = P_L(t) * Z_{th(j-c)}(t) + T_c(t) \quad \text{Equation (3)}$$

It should be clear that the equation can be applied correspondingly for a situation in which the thermal model includes a heat sink and considers the ambient temperature $T_a$ instead of $T_C$. The ambient temperature (cooling agent temperature) or the case temperature can be obtained by the converter controller 130 from a respective sensor reading.

$$\Delta T_j(t_k) = \sum_{l=0}^{k}(P_l - P_{l-1})\sum_{\mu=0}^{n}r_{th\mu}\cdot\left(1 - e^{\frac{-(t_k-t_{l-1})}{\tau_{th\mu}}}\right)$$

The junction temperature at time $t_k$ may for example be calculated according to $$T_j(t_k)=T_j(t_{k-1})+\Delta T_j(t_k) \qquad \text{Equation (4)}$$

The change in junction temperature $\Delta T_j(t_k)$ has to consider the power losses in the preceding steps and may be determined according to $$\Delta T_j(t_k) = \sum_{l=0}^{k}(P_l - P_{l-1})\sum_{\mu=0}^{n}r_{th\mu}\cdot\left(1 - e^{\frac{-(t_k-t_{l-1})}{\tau_{th\mu}}}\right) \qquad \text{Equation (5)}$$

wherein P indicates the total power loss and r, τ are the coefficients of the thermal model, as outlined above.

Steps 205 and 206 accordingly allow a precise estimation of the junction temperature of the semiconductor component based on the previously determined junction temperature, the total power losses determined in steps 203 and 204 and the thermal model with its respective parameters.

$$T_j(t)=P_L(t)*Z_{th(j-c)}(t)+T_c(t)$$

Figure 6:
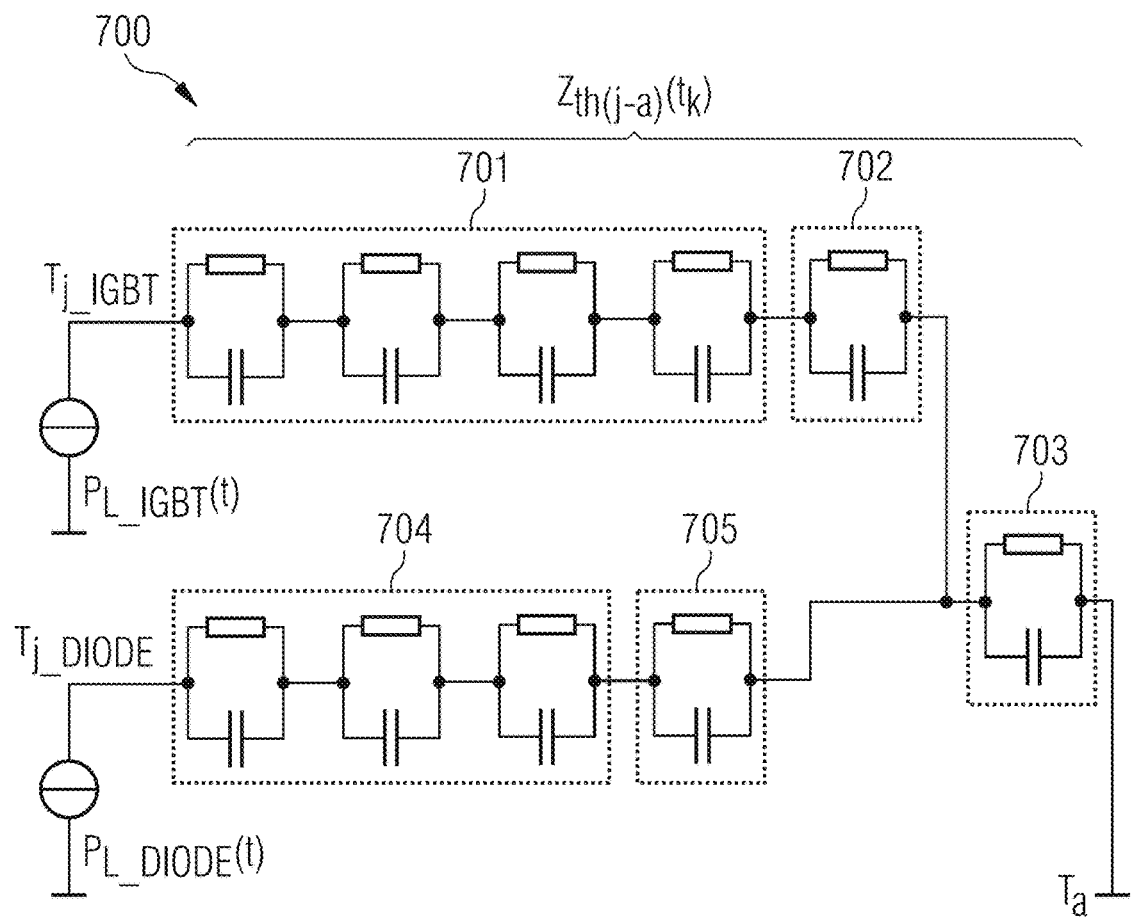
FIG. 6 is a schematic drawing showing a thermal model used in an embodiment of the invention.

It should be clear that different thermal models or more complex thermal models may be used to derive the junction temperature $T_j$. For example, if the converter includes a semiconductor module that comprises semiconductor components in form of a diode and an IGBT, then a combined thermal model that considers both the diode and the IGBT, which may be coupled to the same heat sink, may be employed. An example of such combined model 700 is shown in FIG. 6, wherein the reference numeral 701 is the model for the IGBT, 702 a model for thermal grease, 703 a model for the heat sink, 704 a model for the diode, and 705 a model for the thermal grease by which the diode is coupled to the heat sink. Both, diode and IGBT, are connected vie respective thermal grease to the heat sink. The power losses $P_{L\_IGBT}$ and $P_{L\_DIODE}$ of the IGBT and the DIODE are considered in the model.

Further, it should be clear that certain simplifications and approximations may be used in the determination of the junction temperature to make the determination more efficient and safer. For example, when the junction temperature of both a diode and an IGBT of the same module are estimated, the higher of the two junction temperatures determined in the preceding iteration step may be used in the calculation of the junction temperature of both components in the current step. It can thereby be ensured that the junction temperature is not underestimated. In other embodiments, only the junction temperature of a semiconductor switch, in particular of an IGBT is estimated.

In the decision step 207, it is checked if the estimated junction temperature exceeds a predetermined temperature threshold. The junction temperature is estimated for each of the semiconductor components of at least the generator side converter stage 111. The largest of the estimated junction temperatures may then be compared to the temperature threshold. Alternatively, each of the estimated junction temperatures may be compared to the temperature threshold to determine if an over-temperature condition exists for one of the semiconductor components. As an example, the temperature threshold may be set to 100° C. for a semiconductor component for which the maximal junction temperature has a value of $T_{max}$=140° C. The temperature threshold may lie within a range of about 60% to 90% of the maximal junction temperature of the respective semiconductor component. The temperature threshold may be adjusted so as to achieve the desired protection function.

If the largest estimated junction temperature (or any estimated junction temperature) does not exceed the temperature threshold value, the next iteration step of estimating the junction temperature is performed, i.e. steps 202-206 are repeated with an increased counter k=k+1.

The time period between subsequent iteration steps of estimating the junction temperature (i.e. for one cycle of the iteration) is chosen such that a real time estimation of the junction temperature is achieved and that the AC currents can be approximated as constant during the time period. For example, the time period may be smaller than ¹/₁₀ of the AC period of the AC voltage at the output of converter 110. Accordingly, at 50 Hz output voltage, the time period may be smaller than 2 ms. The time period may be smaller than 1 ms and may lie within a range of about 20 µs to 200 µs. For example, the time period may be about 80, 90, 100, 110, or 120 µs. An embodiment employs a time period of 100 µs.

If in step 207, the largest junction temperature exceeds the temperature threshold, a protection mechanism is triggered (step 208). For example, triggering a protection mechanism may include activating the passive crowbar stage 170 to cause an immediate drop in the associated currents in order to prevent the junction temperature $T_T$ from reaching destructive values. Triggering a protection mechanism may additionally or alternatively include the inserting of a delay to allow the junction temperature to drop and to only resume the switching of the semiconductor component once the junction temperature has come down to values low enough for the diode to be able to block the DC Link voltage if the opposite (associated) IGBT is turned on. The controller 130 can delay the switching as desired to allow one or more of the semiconductor components to cool down. Additionally or alternatively, the triggering of the protection mechanism may include the triggering of a main protection mechanism of the wind turbine, which may disconnect electrical equipment from the power grid. For example, the converter 110 and/or the generator 20 may be disconnected from the power grid 40.

Additionally, triggering a protection mechanism may comprise triggering an alarm, e.g. for informing an operator about the occurrence of the over-temperature event.

In step 209, it is checked if the operating temperature of the respective semiconductor component has been restored. A second temperature threshold may for example be defined, and the current junction temperature may be compared to this second threshold to determine if it has fallen below this second threshold, indicating the restoring of normal operating conditions. The second temperature threshold may be the same as the first temperature threshold or may be lower.

If it is found in step 209 that the temperature has not been restored to operating conditions, additional protection mechanisms may be employed, such as disconnecting the wind turbine from the power grid 40, e.g., by opening respective circuit breakers.

It should be clear that also during steps 208 and 209, the estimation of the junction temperature (steps 202-206) can continue to be performed in parallel (not shown in FIG. 2), so that an current (real time) estimation of the junction temperature is available when implementing the protection mechanism and when determining that the over-temperature condition is no longer present.

Figure 3:
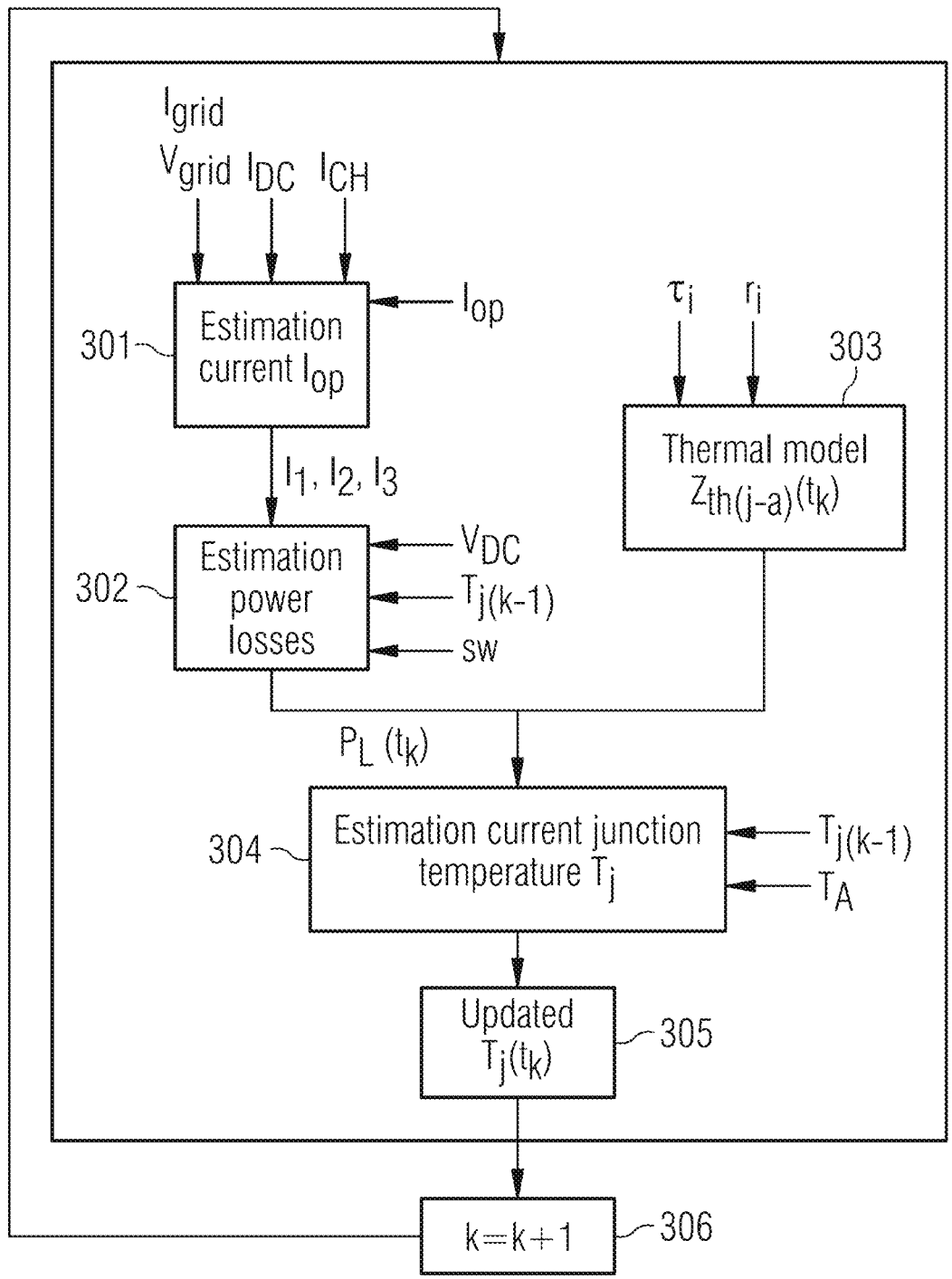
FIG. 3 is a schematic drawing illustrating the estimation of the junction temperature in accordance with an embodiment.

FIG. 3 illustrates the estimation of the junction temperature in blocks of a flow diagram. In block 301, the operating currents of the converter 110 are estimated, as described with respect to step 202. The current estimation receives as an input the measured operating currents $I_{OP}$, which are $I_1$, $I_2$ and $I_3$ shown in FIG. 4 and measured by the sensors 141, 142 and 143. It should be clear that one or more of these may be out of range. The current estimation 301 further receives the AC grid voltage and currents $I_{grid}$ and $V_{grid}$ at the output of the converter 110 as well as the current into the DC capacitor $I_{DC}$ and into the DC chopper stage $I_{CH}$. Based on these operating parameters of the converter, block 301 estimates one or two currents that are out of range, in particular the largest current if two currents are out of range, as described above. The obtained operating currents $I_1$, $I_2$ and $I_3$ are then provided to block 302, in which the power losses associated with the semiconductor components are estimated.

The power loss estimation 302 uses the currents $I_1$, $I_2$, and $I_3$ in each leg of the respective converter stage, the DC link voltage VDC, the junction temperature $T_{j(k-1)}$ estimated in the preceding iteration step and the switching states as inputs to derive the power losses associated with each semiconductor component, as described above with respect to steps 203 and 204 of FIG. 2. The estimated total power losses $P_L$ are provided to the junction temperature estimation block 304. Furthermore, the junction temperature estimation block 304 receives the thermal model 303 that is based on the model parameters $r_i$ and $\tau_i$, as outlined in detail above.

The current junction temperature is estimated in block 304 on the basis of the junction temperature of the preceding step, the total power loss $P_L$, the thermal model and the temperature $T_A$ of the cooling liquid. As a result 305, an updated junction temperature is provided. The iteration index k is then increased (block 306) and the estimation is repeated.

It should be clear that the blocks 301-305 can be implemented on the converter controller 130 or on any other suitable controller of the wind turbine. Further, it should be clear that the blocks 301-306 can implement the method of estimating the junction temperature described above with respect to FIG. 2.

The above description has been given with respect to the estimation of the junction temperature of a semiconductor component in a generator side stage of the converter 110. The described method is particularly beneficial for such estimation, since the rotor currents can reach high values that can no longer be measured by the associated current sensors. The present embodiments overcome this deficiency as they allow the estimation of the respective currents even when they are out of range. Certainly, the method and system can also be applied to estimate the junction temperature of one or more semiconductor components of the grid side converter stage of converter 110.

Further, the described method and system employ an iterative process that is fast enough to simplify the determination of the junction temperature and that allows a real time estimation of the junction temperature. Real time refers to the fact that the actual junction temperature is estimated, the estimation being repeated in short time intervals as specified herein. The disclosed method and system can thereby react quickly to transients occurring on the power grid, which lead to high overcurrents in the rotor of the generator that can damage the converter 110. The computational effort can be kept relatively low, and standard current sensors can be used for sensing the currents at the input to the converter 110.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of protecting a converter of a wind turbine, wherein the converter is coupled to a generator of the wind turbine to perform conversion of electrical power produced by the generator, the converter comprising plural semiconductor components that are operational to provide the conversion of the electrical power, wherein the method comprises: performing a step of estimating an actual junction temperature of at least one of the semiconductor components by
   determining a current in the converter associated with power loss in one or more of the semiconductor components;
   estimating power loss associated with the one or more semiconductor components based on the determined current and on a state of the one or more semiconductor components; and
   using a thermal model of the one or more semiconductor components to estimate the actual junction temperature of at least one of the one or more semiconductor components based on the estimated power loss;
   wherein the step of estimating the actual junction temperature is repeatedly performed, wherein a time period corresponding to a step size between subsequent steps of estimating the actual junction temperature is of a magnitude ensuring that the current in the converter remains relatively constant over the time step; and
   if the estimated actual junction temperature exceeds a predetermined temperature threshold, triggering a protection mechanism that is configured to reduce the actual junction temperature of the at least one semiconductor component,
   wherein the determining of the current in the converter comprises determining an operating current of the converter that is indicative of the current through the at least one semiconductor component, wherein the operating current of the converter is measured if the operating current lies within a working range of a respective current sensor and wherein the operating current is estimated based on operational parameters of the converter if the operating current lies outside the working range of the current sensor.

2. The method according to claim 1, wherein the step size between subsequent steps of estimating the actual junction temperature corresponds to a time period smaller than 1 milliseconds, smaller than 500 microseconds, or smaller than 200 microseconds.

3. The method according to claim 1, wherein the power loss associated with the semiconductor component is dependent on the actual junction temperature of the semiconductor component, wherein when estimating the power loss associated with the one or more semiconductor components, a junction temperature determined in preceding step of estimating the actual junction temperature is employed.

4. The method according to claim 1, wherein estimating the power loss associated with the one or more semiconductor components comprises determining one or more operating states of the one or more semiconductor components during the time period and determining the power loss from the power loss associated with each of the one or more operating states of the one or more semiconductor components during the time period.

5. The method according to claim 1, wherein the at least one semiconductor component comprises or is a semiconductor switch, in particular an IGBT, wherein the power losses include at least switching losses and conduction losses of the semiconductor switch during the time period.

6. The method according to claim 1, wherein the thermal model is a Foster model or a Cauer model.

7. The method according to claim 1, wherein the thermal model considers a temperature of an ambient medium to which the semiconductor component is exposed, the method further comprising obtaining the temperature of the ambient medium, wherein the ambient medium is a cooling fluid provided for cooling the semiconductor component.

8. The method according to claim 1, wherein the determining of the current comprises the determining of the current through each of the one or more semiconductor components, wherein the power loss is estimated individually for each of the one or more semiconductor components based on the current through the respective semiconductor component and the switching state of the respective semiconductor component, wherein the actual junction temperature is estimated for each of the one or more semiconductor components based on the power loss estimated for the respective semiconductor component.

9. The method according to claim 1, wherein the triggering of a protection mechanism comprises at least one of opening one or more circuit breakers associated with the operation of the converter, activating a crowbar stage coupled to the converter, in particular to a generator side converter stage of the converter, and delaying switching of semiconductor components of the converter.

10. The method according to claim 1, wherein the time period corresponding to a step size is smaller than $\frac{1}{10}$ of the period of an AC voltage output by the converter.

11. A protection system for protecting a converter of a wind turbine, wherein the converter is coupled to a generator of the wind turbine to perform conversion of electrical power produced by the generator, the converter comprising plural semiconductor components that are operational to provide the conversion of the electrical power, wherein the protection system comprises a controller, wherein the controller is configured to perform the steps of:

performing a step of estimating an actual junction temperature of at least one of the semiconductor components by determining a current in the converter associated with power loss in one or more of the plural semiconductor components;

estimating power loss associated with the one or more semiconductor components based on the determined current and on a state of the one or more semiconductor components; and using a thermal model of the one or more semiconductor components to estimate the actual junction temperature of at least one of the one or more semiconductor components based on the estimated power loss, wherein the step of estimating the actual junction temperature is repeatedly performed, wherein a time period corresponding to a step size between subsequent steps of estimating the actual junction temperature is of a magnitude ensuring that the current in the converter remains relatively constant over the time step; and if the estimated actual junction temperature exceeds a predetermined temperature threshold, triggering a protection mechanism that is configured to reduce the actual junction temperature of the semiconductor component, wherein the converter is a three-phase converter having a grid side converter stage and a generator side converter stage, wherein if an operating current of the converter for one phase of the generator side converter stage lies outside a working range of a respective current sensor, the operating current of the converter is estimated from the operating current for the other two phases of the generator side converter stage, and/or wherein if the operating currents for two phases of the generator side converter stage lie outside the working range of the respective current sensors, the operating current for at least one of the two phases is estimated based on a current on a DC link of the converter.

12. The protection system according to claim 11, wherein the protection system comprises the converter, wherein the converter is coupled to a rotor of the generator, wherein the protection system further comprises three current sensors coupled to an input of the converter at the generator side of the converter, each current sensor having a predetermined working range, wherein the determining of a current associated with power loss in the semiconductor component comprises measuring the current for at least one phase of the converter using the respective current sensor.

13. The protection system according to claim 11, wherein the time period corresponding to a step size is smaller than $\frac{1}{10}$ of the period of an AC voltage output by the converter.

14. A computer program product, comprising a computer readable hardware storage device having computer readable program code stored therein, said program code executable by a processor of a computer system to implement a method for protecting a converter of a wind turbine, wherein the computer program comprises control instructions which, when executed by a data processor of a controller of the converter, cause the data processor to perform the method of protecting the converter of a wind turbine, wherein the converter is coupled to a generator of the wind turbine to perform conversion of electrical power produced by the generator, the converter comprising plural semiconductor components that are operational to provide the conversion of the electrical power, wherein the method comprises:

performing a step of estimating an actual junction temperature of at least one of the semiconductor components by determining a current in the converter associated with power loss in one or more of the semiconductor components;

estimating power loss associated with the one or more semiconductor components based on the determined current and on a state of the one or more semiconductor components; and using a thermal model of the one or more semiconductor components to estimate the actual junction temperature of at least one of the one or more semiconductor components based on the estimated power loss;

wherein the step of estimating the actual junction temperature is repeatedly performed, wherein a time period corresponding to a step size between subsequent steps of estimating the actual junction temperature is of a magnitude ensuring that the current in the converter remains relatively constant over the time step and if the estimated actual junction temperature exceeds a predetermined temperature threshold, triggering a protection mechanism that is configured to reduce the actual junction temperature of the at least one semiconductor component, wherein the converter is a three-phase converter having a grid side converter stage and a generator side converter stage, wherein, if the operating currents for two phases of the generator side converter stage lie outside a working range of respective current sensors, the operating current is estimated for the phase for which the operating current is the largest of the three phases, wherein estimating the largest operating current based on a current on the DC link of the converter includes determining a current towards a DC link capacitor of the DC link, determining a current through a chopper stage of the converter and determining a current towards the grid side converter stage.

15. The computer program product according to claim 14, wherein the time period corresponding to a step size is smaller than $1/10$ of the period of an AC voltage output by the converter.

* * * * *